United States Patent
Everitt et al.

(10) Patent No.: US 7,382,377 B1
(45) Date of Patent: Jun. 3, 2008

(54) RENDER TO TEXTURE CULL

(75) Inventors: Cass W. Everitt, Pflugerville, TX (US); William P. Newhall, Jr., San Francisco, CA (US); David B. Glasco, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 779 days.

(21) Appl. No.: 10/871,589

(22) Filed: Jun. 17, 2004

(51) Int. Cl.
*G09G 5/00* (2006.01)

(52) U.S. Cl. .................. 345/582; 345/587; 345/421; 345/422; 345/426; 345/428; 345/620; 345/622; 345/623; 345/626

(58) Field of Classification Search ............... 345/421, 345/422, 426, 428, 620, 622, 623, 582, 587, 345/626
See application file for complete search history.

(56) References Cited

U.S. PATENT DOCUMENTS

| 6,646,639 B1 | 11/2003 | Greene et al. |
| 6,717,576 B1 * | 4/2004 | Duluk et al. ............... 345/419 |

* cited by examiner

*Primary Examiner*—Kimbinh T. Nguyen
(74) *Attorney, Agent, or Firm*—Patterson & Sheridan, LLP

(57) ABSTRACT

Method and apparatus for processing one or more fragment data. In one embodiment, the method includes processing one or more fragment data to generate one or more texture map addresses for one or more texels, determining relevance information that correspond to the texture map addresses, and translating the relevance information into a rendering constraint data structure.

20 Claims, 5 Drawing Sheets

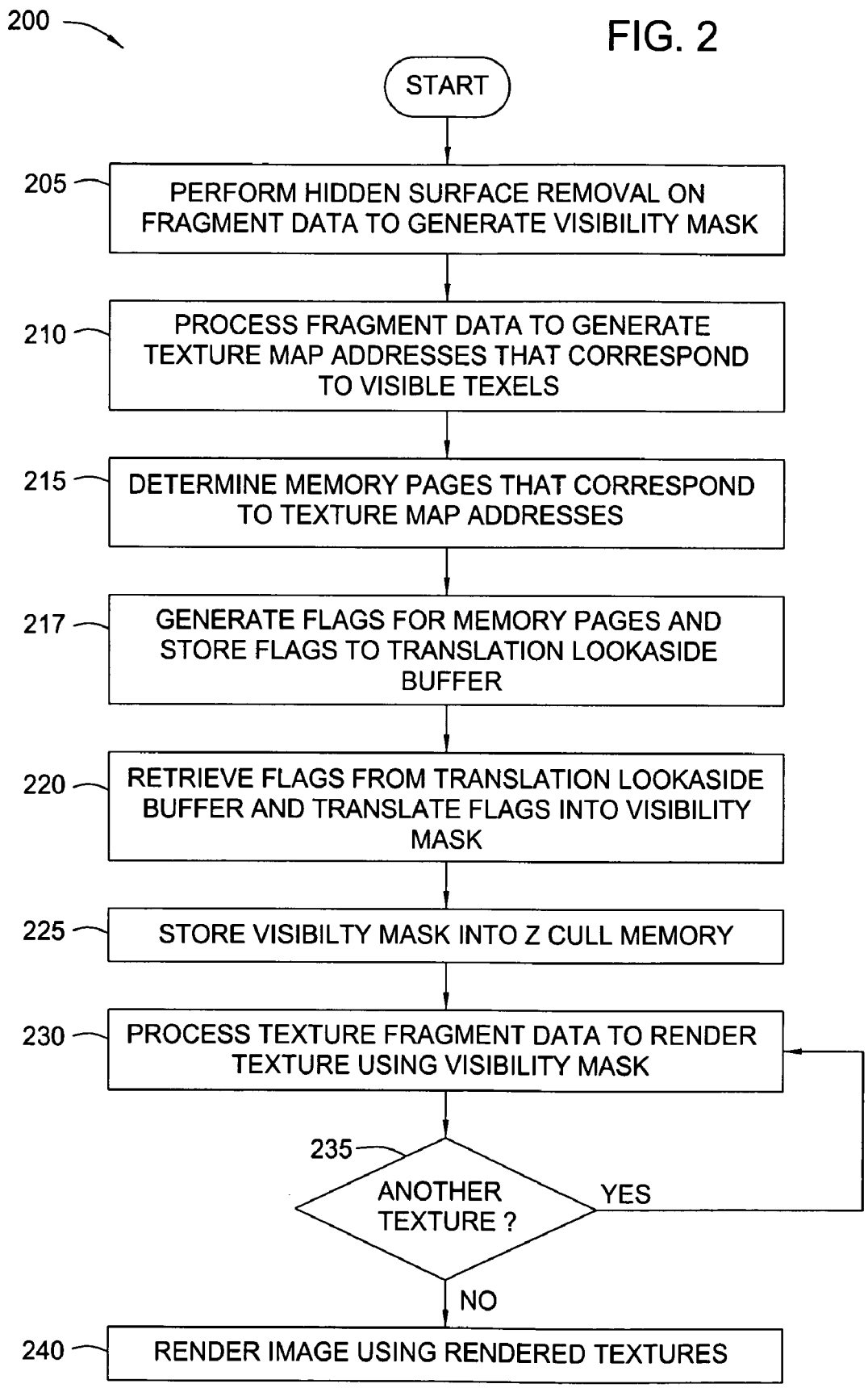

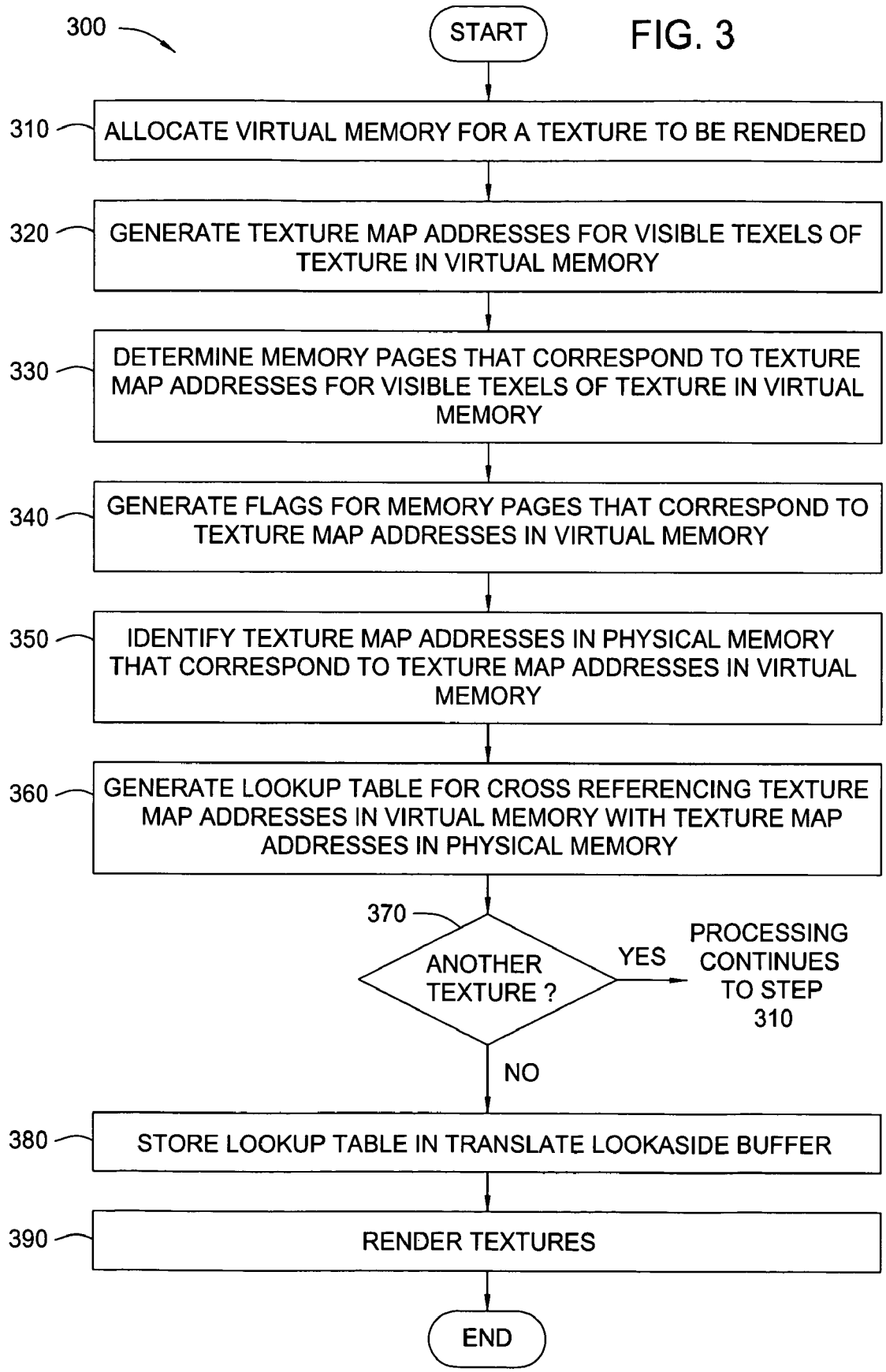

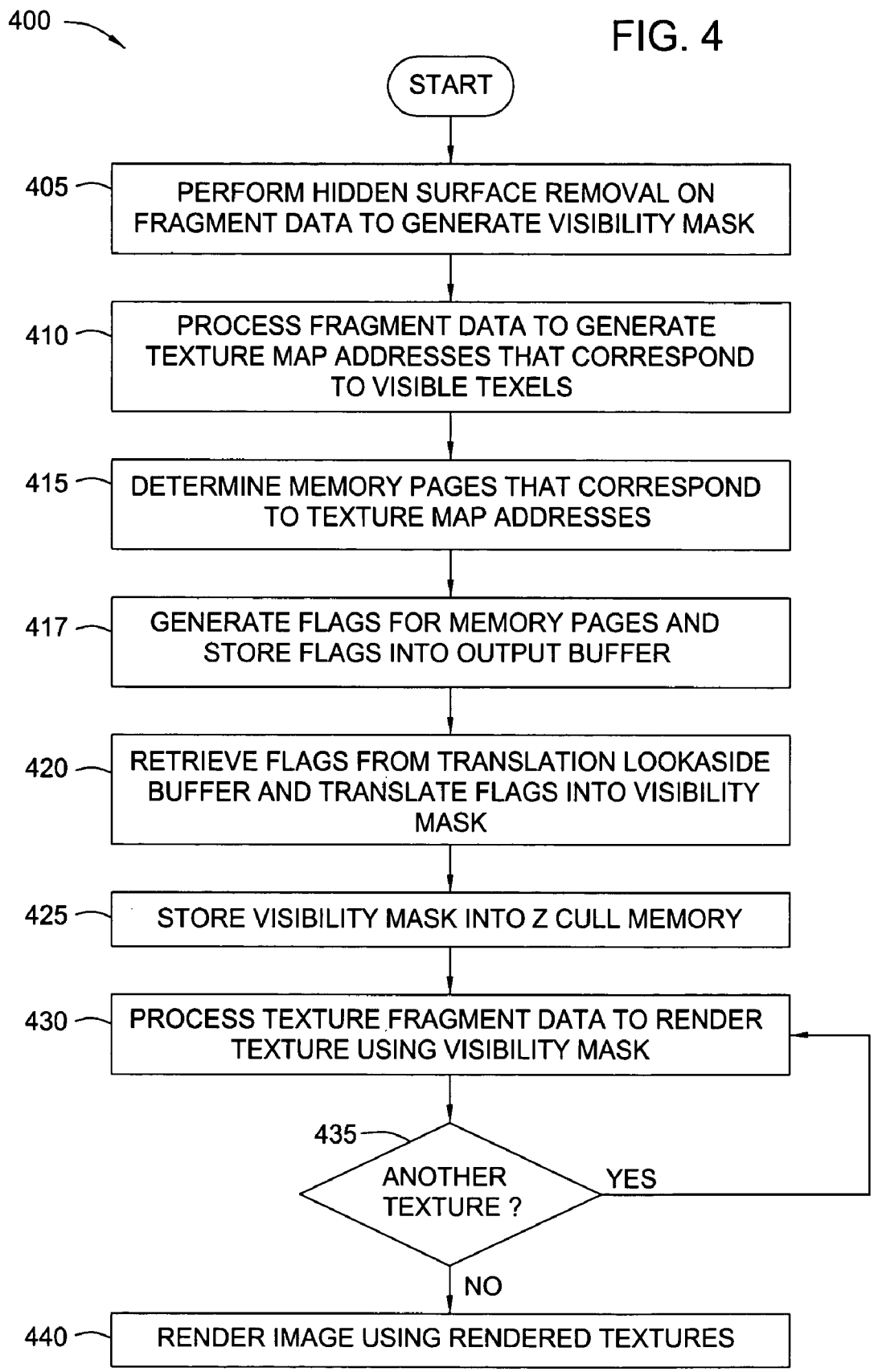

RENDER TO TEXTURE CULL

BACKGROUND OF THE INVENTION

1. Field of the Invention

Embodiments of the present invention generally relate to computer graphics, and more particularly to occlusion culling during rendering in a computer graphics processing pipeline.

2. Description of the Related Art

During graphics processing, a computer is commonly used to display three-dimensional representations of an object on a two-dimensional display screen. In a typical graphics computer, an object to be rendered is divided into a plurality of graphics primitives. The graphics primitives are basic components of a graphics picture and may be defined by geometry, such as point, line, vector or polygon, such as a triangle. The graphics primitives are fed through a graphics pipeline where various types of processing occur and then are commonly displayed on an output device.

Render-to-texture is a mechanism for using the graphics pipeline to compute textures that will be used in subsequent rendering phases. One of the problems with the render-to-texture mechanism is that when it is used to generate dynamic textures, most (if not all) of the scene visibility information is lost. Current culling technology is only useful for reducing the cost of shading in the camera's screen space, but not useful for reducing the cost of computing dynamic textures.

Therefore, a need exists in the art for methods of increasing the efficiency of rendering dynamic textures.

SUMMARY OF THE INVENTION

One or more embodiments of the present invention are directed to a method for processing one or more fragment data. In one embodiment, the method includes processing one or more fragment data to generate one or more texture map addresses for one or more texels, determining relevance information that correspond to the texture map addresses, and translating the relevance information into a rendering constraint data structure.

One or more embodiments of the present invention are also directed to a method for rendering a texture. In one embodiment, the method includes allocating a virtual memory for a texture to be rendered, generating one or more texture map addresses for one or more visible texels in the virtual memory, and allocating one or more texture map addresses in a physical memory that correspond to the texture map addresses in the virtual memory.

One or more embodiments of the present invention are also directed a programmable graphics processor, which includes a fragment processor configured to process one or more fragment data to generate one or more texture map addresses for one or more texels and to determine relevance information that correspond to the texture map addresses, and a z cull unit configured to restrict the rendering of the texels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates a flow diagram of a method for rendering an image in accordance with various embodiments of the invention.

FIG. 3 illustrates a flow diagram of a method for rendering a texture in connection with rendering a high quality image in accordance with another embodiment of the invention.

FIG. 4 illustrates a flow diagram of a method for rendering an image in accordance with one embodiment of the invention.

DETAILED DESCRIPTION

Figure 1A:
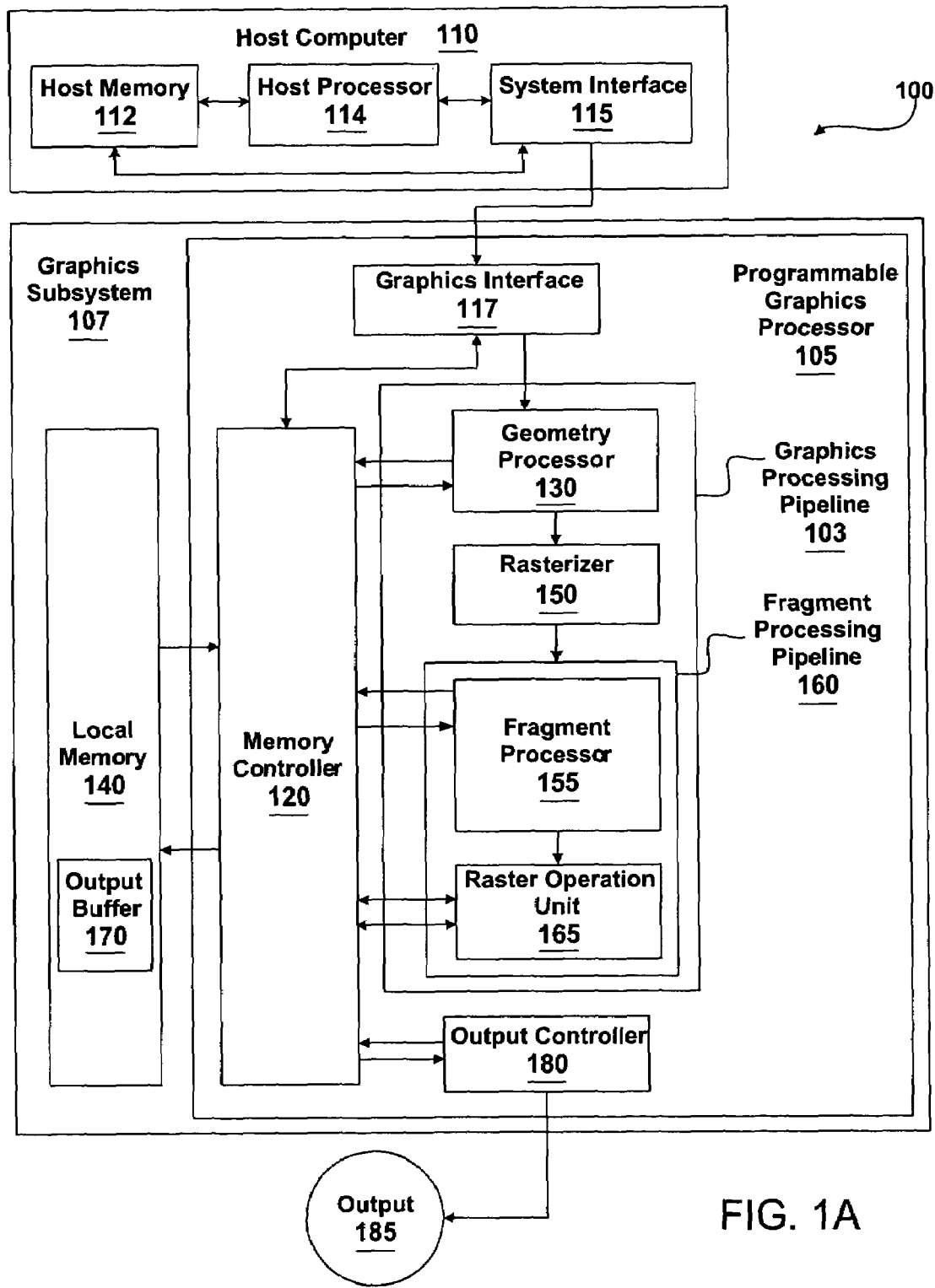
FIG. 1A illustrates a block diagram of a computing system that includes various embodiments of the invention.

FIG. 1A illustrates a block diagram of a computing system 100 that includes various embodiments of the invention. The computing system 100 includes a host computer 110 and a graphics subsystem 107. The computing system 100 may be a desktop computer, server, laptop computer, palm-sized computer, tablet computer, game console, portable wireless terminal, such as a personal digital assistant (PDA) or cellular telephone, computer based simulator, or the like. The host computer 110 includes a host processor 114, which may include a system memory controller to interface directly to a host memory 112. The host processor 114 may also communicate with a host memory 112 through a system interface 115. The system interface 115 may be an I/O (input/output) interface or a bridge device, which may include a system memory controller to interface directly to the host memory 112. An example of the system interface 115 known in the art includes Intel® Northbridge.

The host computer 110 communicates with the graphics subsystem 107 via the system interface 115 and a Graphics Interface 117. The graphics subsystem 107 may include various components, such as a local memory 140 and a programmable graphics processor 105. The programmable graphics processor 105 uses memory to store graphics data in multiple output buffers and program instructions. Graphics data is generally defined as any data that is input to or output from computation units within the programmable graphics processor 105. Graphics memory is any memory used to store program instructions to be executed by the programmable graphics processor 105 or output buffers containing graphics data. Graphics memory may include portions of the host memory 112, the local memory 140 directly coupled to the programmable graphics processor 105, register files coupled to the computation units within programmable graphics processor 105, and the like. The local memory 140 may further include an output buffer 170 for storing relevance information, such as a set of flags for a set of memory pages that correspond to texture map address for visible texels. The relevance information may be referred to as page access bit, which are stored in memory and cached in the memory controller. In one embodiment, every access to a page results in setting of the corresponding page access bit.

In addition to the graphics interface 117, the programmable graphics processor 105 includes a graphics processing pipeline 103, a memory controller 120 and an output controller 180. Data and program instructions received at the graphics interface 117 can be passed to a geometry processor 130 within the graphics processing pipeline 103 or written to the local memory 140 through the memory controller 120. The memory controller 120 includes read interfaces and write interfaces that each generate address and control signals to the local memory 140, storage resources, and the graphics interface 117. Storage resources may include register files, caches, FIFO (first in first out) memories, and the like. In addition to communicating with the local memory 140, and the graphics interface 117, the memory controller 120 also communicates with the graphics processing pipeline 103 and the output controller 180 through read and write interfaces in the graphics processing pipeline 103 and a read interface in the output controller 180. The read and write interfaces in the graphics processing pipeline 103 and the read interface in the output controller 180 generate address and control signals to the memory controller 120.

The graphics processing pipeline 103 may include a geometry processor 130 and a programmable graphics fragment processing pipeline 160, which each performs a variety of computational functions. Some of these functions are table lookup, scalar and vector addition, multiplication, division, coordinate-system mapping, calculation of vector normals, tessellation, calculation of derivatives, interpolation, and the like. The geometry processor 130 and the fragment processing pipeline 160 are optionally configured such that data processing operations are performed in multiple internal passes through the graphics processing pipeline 103 or in multiple passes through the fragment processing pipeline 160. Each pass through the programmable graphics processor 105, the graphics processing pipeline 103 or the fragment processing pipeline 160 concludes with optional processing by a raster operation unit 165. Data produced in a pass through the programmable graphics processor 105, the graphics processing pipeline 103 or the fragment processing pipeline 160 may be written to an output buffer in graphics memory, such as the local memory 140 and/or the host memory 112, to be read from at a later time.

Vertex programs are sequences of vertex program instructions compiled by the host processor 114 for execution within the geometry processor 130 and a rasterizer 150. Fragment programs are sequences of fragment program instructions compiled by the host processor 114 for execution within the fragment processing pipeline 160. The geometry processor 130 receives a stream of program instructions (vertex program instructions and fragment program instructions) and data from the graphics interface 117 or the memory controller 120, and performs vector floating-point operations or other processing operations using the data. The program instructions configure sub-units within the geometry processor 130, the rasterizer 150 and the fragment processing pipeline 160. The program instructions and data may be stored in graphics memory. When a portion of the host memory 112 is used to store program instructions and data, the portion of the host memory 112 can be uncached to increase performance of access by the programmable graphics processor 105. On the other hand, configuration information may be written to registers within the geometry processor 130, the rasterizer 150 and the fragment processing pipeline 160 using program instructions, encoded with the data, or the like.

Program instructions and data processed by the geometry processor 130 are passed from the geometry processor 130 to a rasterizer 150. The rasterizer 150 is a sampling unit that processes graphics primitives and generates sub-primitive data, such as fragment data and coverage data for each pixel or sub-pixel position. Coverage data indicates which sub-pixel sample positions within a pixel are "covered" by a fragment formed by the intersection of a pixel and a primitive. Graphics primitives include geometry data, such as points, lines, triangles, quadrilaterals, meshes, surfaces, and the like. The rasterizer 150 converts graphics primitives into sub-primitive data, thereby performing scan conversion on the data processed by the geometry processor 130. The rasterizer 150 outputs fragment program instructions and fragment data to the fragment processing pipeline 160. Therefore, the fragment programs configure the fragment processing pipeline 160 to operate on fragment data.

The fragment programs configure the fragment processing pipeline 160 to process fragment data by specifying computations and computation precision. The fragment processing pipeline 160 includes a fragment processor 155, which is configured by fragment program instructions such that fragment data processing operations are performed in multiple passes within the fragment processor 155. The fragment processor 155 outputs processed fragment data and codewords generated from fragment program instructions to the raster operation unit 165. The codewords may include per-fragment operation values, such as per-fragment stencil operations, z compare functions, alpha functions, and blend functions. The raster operation unit 165 includes a read interface and a write interface to the memory controller 120 through which the raster operation unit 165 accesses data stored in one or more output buffers in the local memory 140 or host memory 112. The raster operation unit 165 optionally performs near and far plane clipping and raster operations, such as stencil, z test, blending, and the like, using fragment data read from the one or more buffers in the local memory 140 or host memory 112 at the x, y position associated with the fragment data and the processed fragment data to produce output data. The output data from the raster operation unit 165 is written to an output buffer in the local memory 140 or host memory 112 at the x, y position within the output buffer associated with the output data.

In various embodiments, the memory controller 120, the local memory 140, and the geometry processor 130 are configured such that data generated at various points along the graphics processing pipeline 103 may be output via the raster operation unit 165 and provided to the geometry processor 130 or the fragment processor 155 as input. The output data, e.g., color, depth, and other parameters, may be processed according to a fragment program and stored in one or more output buffers in graphics memory to be used as texture maps, e.g., shadow map, height field, stencil, displacement maps, and the like, by a fragment program. Alternatively, color and depth output data may be written to an output buffer, and later read and processed by the raster operation unit 165 to generate the final pixel data prior to being scanned out for display via the output controller 180. The graphics data processed by the geometry processor 130, the rasterizer 150, or the fragment processor 155 can be primitive data, surface data, pixel data, vertex data, fragment data, or the like.

When processing is completed, an output 185 of the graphics subsystem 107 is provided using the output controller 180. Alternatively, the host processor 114 reads the composited frame, e.g., output buffer, stored in the local memory 140 through the memory controller 120, the graphics interface 117 and the system interface 115. The output controller 180 is optionally configured by opcodes, received from the graphics processing pipeline 103 via the memory controller 120, to deliver data to a display device, network, electronic control system, the computing system 100, the graphics subsystem 107, or the like.

Figure 1B:
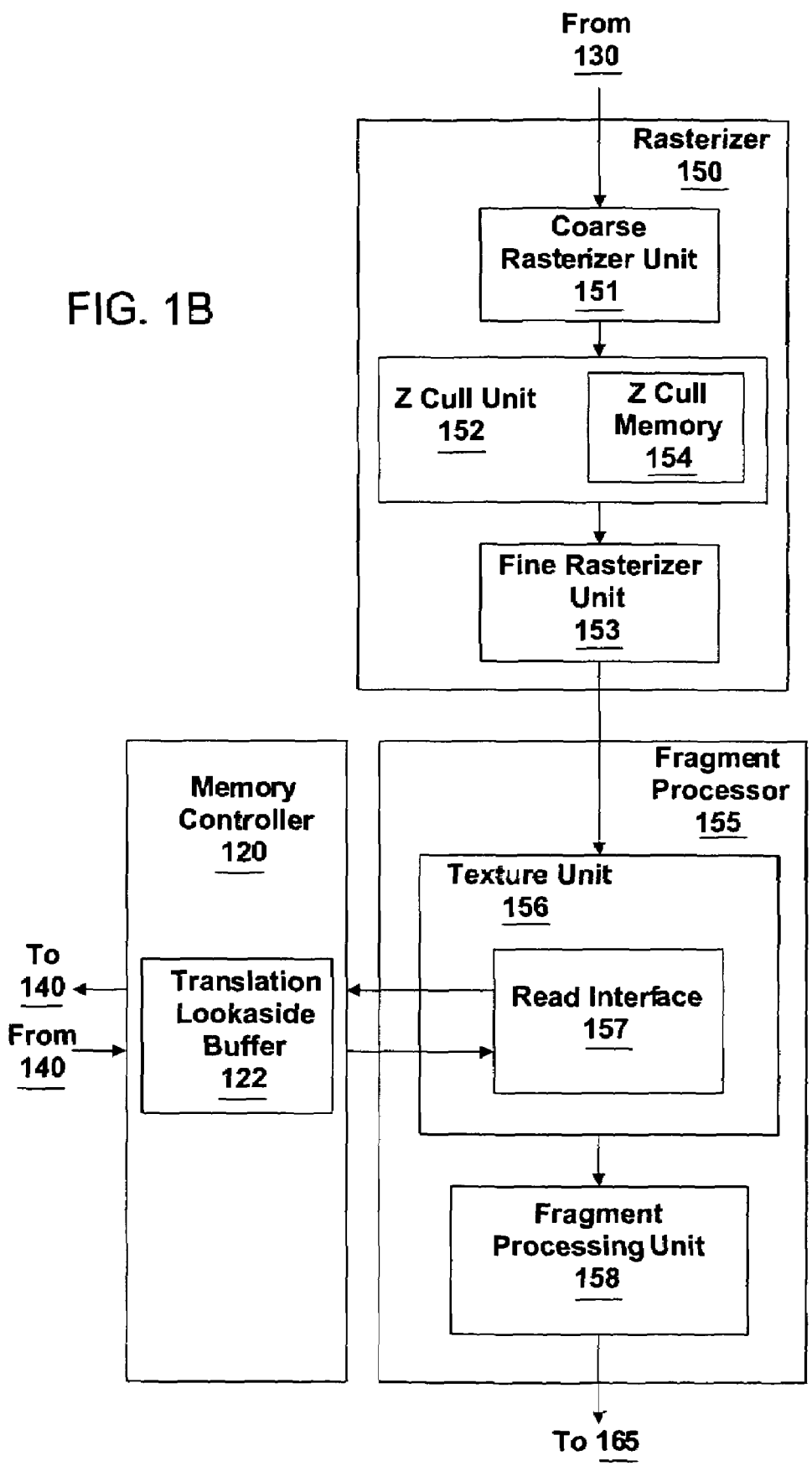
FIG. 1B illustrates a detailed block diagram of the rasterizer, the fragment processor and the memory controller in accordance with one or more embodiments of the invention.

FIG. 1B illustrates a detailed block diagram of the rasterizer 150, the fragment processor 155 and the memory controller 120 in accordance with one or more embodiments of the invention. The rasterizer 150 includes a coarse rasterizer unit 151, a z cull unit 152, a fine rasterizer unit 153 and a z cull memory 154. The coarse rasterizer unit 151 processes the graphics primitive tiles at larger sizes than the tiles processed by the fine rasterizer unit 153. For example, the tiles processed by the coarse rasterizer unit 151 may be 16 by 16 pixel region or 8×8 pixel region, while the tiles processed by the fine rasterizer unit 153 may be 4×4 pixel region or 2×2 pixel region. Both coarse rasterizer unit 151 and fine rasterizer unit 153 process graphics primitive tiles to produce sub-primitive tile parameters and sub-primitive coverage data, which are sent as output to the z cull unit 152. The z cull unit 152 compares the z value for each sub-primitive tile to the z values stored in the z cull memory 153 and performs a hidden surface removal on each sub-primitive tile using various techniques known by ordinary persons skilled in the art. The z cull memory 153 may be a random access memory (RAM).

The fragment processor 155 includes a texture unit 156 and a fragment processing unit 158. The texture unit 156 receives data from the rasterizer 150. Such data may include program instructions and parameters associated with fragments, e.g., texture IDs and texture parameters (e.g., s, t, r and the like). The texture unit 156 may include a level of detail (LOD) unit, which receives texture parameters and determines LOD values using techniques known to persons with ordinary skill in the art. The texture unit 156 includes a read interface 157, which reads the fragment program instructions and the fragment parameters from local memory 140 or host memory 112 via memory controller 120. The texture unit 156 outputs the fragment parameters and the program instructions to the fragment processing unit 158, which processes the fragment parameters as specified by the program instructions to produce shaded fragment data. The fragment processing unit 158 may also store shaded fragment data, e.g., x, y, color, depth, configuration control and other parameters. The fragment processing unit 158 outputs the shaded fragment data to the raster operation unit 165.

The memory controller 120 may also include a translation lookaside buffer 122. The translation lookaside buffer 122 is configured to store relevance information that corresponds to the texture map addresses for visible texels. The translation lookaside buffer 122 will be described in more detail in the following paragraphs with reference to FIG. 2.

FIG. 2 illustrates a flow diagram of a method 200 for rendering an image in accordance with various embodiments of the invention. At step 205, a hidden surface removal is performed on fragment data by the graphics processing pipeline 103. The hidden surface removal may be performed using the coarse rasterizer unit 151, the fine rasterizer unit 153 and the z cull unit 152, as described in the above paragraphs. The hidden surface removal is used to generate a rendering constraint data structure containing the frontmost z values. The rendering constraint data structure may be stored in the z cull memory 154. Embodiments of the invention contemplate various techniques for hidden surface removal known by persons of ordinary skill in the art. Step 205 may be referred to as a first pass through the graphics processing pipeline 103. In an alternate embodiment, the hidden surface removal may be performed by the host computer 110.

At step 210, the fragment data is processed by the graphics processing pipeline 103 to generate a set of texture map addresses, which correspond to a set of visible texels. In this manner, the graphics processing pipeline 103 only generates the texture map addresses for fragment data that are not culled by the z cull unit 152. In one embodiment, the texture map addresses are computed by the texture unit 156 using the fragment parameters and LOD values determined by the LOD unit (not shown).

At step 215, the fragment processor 155 determines or identifies a memory page that corresponds to each texture map address. At step 217, the memory controller 120 generates a flag for every memory page that corresponds to each texture map address. Each flag is stored in the translation lookaside buffer 122. As such, the translation lookaside buffer 122 contains a set of flags for memory pages that correspond to the texture map addresses for the visible texels. These flags for memory pages that correspond to the texture map addressed for the visible texels are referred to as relevance information. In one embodiment, the flags may be stored in the texture unit 156 or read interface 157. The flags generally correspond to texture coordinates, e.g., s and t, or texture indices, e.g., i and j, used to compute texture addresses. At step 220, the host computer 110 retrieves the flags from the translation lookaside buffer 122 and translates the flags into a rendering constraint data structure, which may be a stencil mask, a visibility mask, scissor rectangles, miplevel access masks, clipping planes and the like. At step 225, the host computer 110 stores the rendering constraint data structure into the z cull memory 154. In one embodiment, steps 220-225 may be performed by the graphics processor 105. Steps 210-225 may be referred to as a second pass through the graphics processing pipeline 103.

At step 230, the fragment processor 155 processes a set of texture fragment data to render a texture using the rendering constraint data structure stored in the z cull memory 154. Since the flags from the translation lookaside buffer 122 have been translated into the rendering constraint data structure, the rendering constraint data structure contains a set of flags for memory pages that correspond to the texture map addresses for the visible texels. Texture fragment data typically contains geometry information of the texture. In one embodiment, the z cull unit 152 restricts the rendering of texels having texture map addresses that correspond to the rendering constraint data structure. For example, the z cull unit 152 may restrict the rendering of texels whose texture map addresses are not referenced in the rendering constraint data structure. As another example, the z cull unit 152 may restrict the rendering of texels whose texture map addresses are referenced in the rendering constraint data structure. In this manner, the texels having texture map addresses that correspond to the rendering constraint data structure may be culled by the z cull unit 152 in the texture space prior to reading the fragment data, thereby conserving memory bandwidth. In rendering the texture, the fragment processor 155 may read the visible texels through the texture unit 156. In one embodiment, the relevance information includes bounding boxes, which may be used to restrict the rendering of textures to specify scissor rectangles or clipping planes.

At step 235, a determination is made as to whether an additional texture needs to be processed to render the image. If the answer is in the affirmative, processing returns to step 230 at which the fragment processor 155 processes another set of texture fragment data to render the additional texture using the rendering constraint data structure stored in the z cull memory 154. In one embodiment, the additional textures may be rendered using different rendering constraint data structures. If the answer is in the negative, processing continues to step 240, at which the image is rendered using the rendered textures.

FIG. 3 illustrates a flow diagram of a method 300 for rendering a texture in connection with rendering a high quality image in accordance with another embodiment of the invention. At step 310, a virtual memory for one or more textures to be rendered is allocated. Since the textures may be high resolution textures, the size of the textures may be arbitrarily large. At step 320, texture map addresses for a set of visible texels in the texture in the virtual memory are generated. At step 330, memory pages that correspond to the texture map addresses for the visible texels in the virtual memory are identified. At step 340, a set of flags for the memory pages that correspond to the texture map addresses in the virtual memory is generated. As mentioned above, these flags for the memory pages that correspond to the texture map addresses may be referred to as relevance information. At step 350, the texture map addresses in a physical memory that correspond to the texture map addresses in the virtual memory are identified. In one embodiment, dependencies between visible and non-visible texels and between mipmap levels are determined. For instance, if a particular mipmap level is accessed (visible), then the texture map addresses in the physical memory corresponding to any higher resolution mipmaps used to generate (via filtering) the particular mipmap level will be determined. In one embodiment, the relevance information is translated into a mipmap level-of-detail bitmask, which may then be used to render textures at one or more levels-of-detail.

At step 360, a look up table (which may also be referred to as a page table) for cross referencing the texture map addresses in the virtual memory with the texture map addresses in the physical memory is generated. At step 370, a determination is made as to whether another texture is to be rendered. If the answer is in the affirmative, then processing returns to step 310. If the answer is in the negative, then processing continues to step 380.

At step 380, the look up table for cross referencing the texture map addresses in the virtual memory with the texture map addresses in the physical memory is stored in the translation lookaside buffer 122. At step 390, the textures are rendered using the look up table for cross referencing the texture map addresses in the virtual memory with the texture map addresses in the physical memory. In this manner, the memory controller 120 uses the texture map addresses in the physical memory to render the textures. Some of the steps in method 300 may be performed by the host processor 114 or the programmable graphics processor 105.

FIG. 4 illustrates a flow diagram of a method 400 for rendering an image in accordance with one embodiment of the invention. At step 405, a hidden surface removal is performed on the fragment data to generate a rendering constraint data structure containing the frontmost z values. At step 410, the fragment data are processed to generate a set of texture map addresses for a set of visible texels. At step 415, memory pages that correspond to the texture map addresses are determined or identified. Steps 405 through 415 are described in more detail with reference to steps 205 and 215 above.

At step 417, a set of flags corresponding to the memory pages are generated. As mentioned above, these flags corresponding to the memory pages may be referred to as relevance information. The flags are then stored to an output buffer 170, which may be stored in the local memory 140 or host memory 112. The flags may be stored to the output buffer 170 by the raster operation unit 165. In one embodiment, the flags indicate the u and v coordinates for each texture ID. The u and v coordinates may then be used to index the texture during rendering. In another embodiment, the output buffer may be a z buffer or a stencil buffer.

At step 420, the flags are translated into a rendering constraint data structure. At step 425, the rendering constraint data structure is stored into the z cull memory 154. At step 430, the fragment processor 155 processes a set of texture fragment data to render a texture using the rendering constraint data structure stored in the z cull memory 154. At step 435, a determination is made as to whether an additional texture needs to be processed to render the image. If the answer is in the affirmative, processing returns to step 430 at which the fragment processor 155 processes another set of texture fragment data to render the additional texture using the rendering constraint data structure stored in the z cull memory 154. If the answer is in the negative, processing continues to step 440, at which the image is rendered using the rendered textures. Steps 420 through 440 are described in more detail with reference to steps 220 through 240 above.

While the foregoing is directed to embodiments of the present invention, other and further embodiments of the invention may be devised without departing from the basic scope thereof, and the scope thereof is determined by the claims that follow.

What is claimed is:

1. A method for processing one or more fragment data, comprising:
   processing one or more fragment data to generate one or more texture map addresses for one or more texels to establish a single sample set;
   determining relevance information that correspond to the texture map addresses of the single sample set, the relevance information comprising one or more flags for one or more memory pages that correspond to the texture map addresses;
   translating the relevance information into a rendering constraint data structure; and
   using the rendering constraint data structure to eliminate the rendering of a portion of the texels whose texture map addresses are not referenced in the rendering constraint data structure, wherein the remaining texels are determined to be visible.

2. The method of claim 1, further comprising rendering one or more textures using the rendering constraint data structure.

3. The method of claim 2, wherein rendering the textures comprises restricting the rendering of one or more non visible texels.

4. The method of claim 1, further comprising using the fragment data for shading.

5. The method of claim 1, further comprising, prior to processing the fragment data, performing a hidden surface removal on the fragment data.

6. The method of claim 1, wherein the texels are visible texels.

7. The method of claim 1, further comprising storing the rendering constraint data structure in a texture image space.

8. The method of claim 1, wherein the relevance information comprises one or more bounding boxes.

9. The method of claim 8, further comprising restricting the rendering of one or more textures using the bounding boxes to specify at least one of scissor rectangles of clipping planes.

10. The method of claim 1, further comprising translating the relevance information into a mipmap level-of-detail bitmask.

11. The method of claim 10, further comprising rendering one or more textures at one or more levels-of-detail using the mipmap level-of-detail bitmask.

12. The method of claim 1 wherein the reference data includes a mip-map level, and the method including in response to determining a texel is visible and then establishing as visible any texture maps address having a higher resolution mip-map level.

13. The method of claim 1 wherein the relevance information is translated into a mip-map level of detail bitmask, the bitmask being used to render textures at one of a plurality of levels of detail.

14. A programmable graphics processor, comprising:
a fragment processor configured to process one or more fragment data to establish a single sample set by generating one or more texture map addresses for one or more texels and to determine relevance information that correspond to the texture map addresses; and
a z cull unit configured to restrict the rendering of the texels, including the relevance information, into a rendering constraint data structure; and
using the rendering constraint data structure to eliminate the rendering of a portion of the texels whose texture map addresses are not referenced in the rendering constraint data structure, wherein the remaining texels are determined to be visible.

15. The apparatus of claim 14, further comprising a memory controller having a translation lookaside buffer for storing the relevance information.

16. The apparatus of claim 14, further comprising an output buffer for storing the relevance information.

17. The apparatus of claim 14, further comprising a host computer configured to translate the relevance information to a rendering constraint data structure.

18. The apparatus of claim 17, wherein the fragment processor is further configured to render one or more textures using the rendering constraint data structure.

19. The apparatus of claim 14, wherein the fragment processor, the z cull unit and the memory controller are components of a programmable graphics processor.

20. The apparatus of claim 14, wherein the fragment processor is further configured to perform a hidden surface removal on the fragment data.

* * * * *